United States Patent [19]
Hamilton et al.

[11] Patent Number: 5,579,055
[45] Date of Patent: Nov. 26, 1996

[54] ELECTRONIC PROGRAM GUIDE AND TEXT CHANNEL DATA CONTROLLER

[75] Inventors: Scott Hamilton; Ray T. Haman, both of Duluth; Gregory S. Durden, Jonesboro, all of Ga.; Jan L. Christensen, Plantation; Melvin Paulick, Gainesville, both of Fla.

[73] Assignee: Scientific-Atlanta, Inc., Norcross, Ga.

[21] Appl. No.: 72,911

[22] Filed: Jun. 7, 1993

[51] Int. Cl.[6] .................................................. H04N 7/087
[52] U.S. Cl. ......................... 348/476; 348/468; 348/478; 348/906
[58] Field of Search ................................. 348/460, 473, 348/476–479, 906, 468; 340/324; 345/197; 358/405; H04N 7/08, 7/087, 7/093

[56] References Cited

U.S. PATENT DOCUMENTS

| | | | |
|---|---|---|---|
| 4,052,719 | 10/1977 | Hutt et al. | 340/324 |
| 4,367,488 | 1/1983 | Leventer et al. | 348/478 |
| 4,600,921 | 7/1986 | Thomas | 340/825.31 |
| 4,707,827 | 11/1987 | Bione et al. | 370/85 |
| 4,710,767 | 12/1987 | Sciacero et al. | 345/191 |
| 4,829,558 | 5/1989 | Welsh | 372/92 |
| 4,862,268 | 8/1989 | Campbell et al. | 348/478 |
| 4,890,319 | 12/1989 | Seth-Smith et al. | 380/5 |
| 4,908,707 | 3/1990 | Kinghorn | 348/906 |
| 5,121,476 | 6/1992 | Yee | 395/154 |
| 5,260,788 | 11/1993 | Takano et al. | 348/478 |
| 5,282,238 | 1/1994 | Berland | 358/405 |
| 5,282,249 | 1/1994 | Cohen et al. | 380/23 |

*Primary Examiner*—Nathan J. Flynn
*Attorney, Agent, or Firm*—Woodcock Washburn Kurtz Mackiewicz & Norris

[57] ABSTRACT

A data controller which manages the flow of text and electronic program guide (EPG) information to a cable television viewer. The data controller of the invention receives text and EPG information from one or a plurality of authorized data sources via a communications link, processes the received data in its internal database manager to perform data compression and the like, and then provides this text information to the viewer under control of the head end controller. In a preferred embodiment, the text data is formatted on a screen basis into transactions of a predetermined length and the EPG data is formatted on a program basis into transactions of the same length. The transaction are then inserted into the vertical blanking interval of a channel to which the corresponding text or electronic program data has been assigned. At the viewer's television tuner, the text data and/or EPG data is extracted from the vertical blanking interval and mapped to a virtual channel of the viewer's television tuner for display. The viewer's television tuner includes an EPG memory in which the EPG data may be stored to allow the viewer to scroll forward and backward through the stored EPG. The viewer's television tuner also includes a text memory for storing a page of text data so as to allow automatic pagination of the text data on the display screen after a predetermined amount of time has passed during which the viewer may read the text data.

41 Claims, 6 Drawing Sheets

FIG. 3 (INFORMATION FIELD)

FIG. 4 (TO SCRAMBLERS)

FIG. 7

ELECTRONIC PROGRAM GUIDE AND TEXT CHANNEL DATA CONTROLLER

BACKGROUND OF THE INVENTION

1. Field of the Invention

The present invention relates to a data controller which manages the flow of text and electronic program guide data from the data supplier to the viewer's television tuner. In particular, the data controller of the invention accepts electronic program guide and text data from one or more local or remote sources, processes the data in its internal database manager, and formats the data for transmission to the viewer's television tuner preferably via the vertical blanking intervals of existing cable television channels.

2. Description of the Prior Art

Television text data services are readily available. Such services provide sports, weather, stock market, news, advertising and other information to the viewer's television for display to the viewer. Typically, the text data is provided to the cable head end by the text data service providers and then provided to the viewer via dedicated cable channels provided at the cable head end. At the cable head end, the text data from the different text data service providers is assigned to respective cable television channels available to the viewers, converted into a video signal, and then transmitted to the viewer's television via the assigned cable television channel in place of other programming. The viewer then tunes to the assigned cable television channel to receive the transmitted text data. Unfortunately, this technique wastes valuable video bandwidth for the transmission of the text data and is thus generally undesirable. Also, since the cable head end operator must create a video signal from the text data provided by the service providers prior to transmission of the text data to the viewer, the existing technique for providing text data to a viewer is quite tedious and expensive. A more efficient text data service is desired.

Other techniques for providing text data to viewers are known in the art. For example, closed captioned encoding techniques are used to transmit text data in synchronization with its associated video data by inserting the closed captioned text data into the vertical blanking interval of the video signal. In this manner, not only can synchronization be preserved, but also, additional bandwidth is not necessary for the transmission of the text data. However, the closed captioned text data must be inserted into the vertical blanking interval of the video signal by the producer of the video programming. As a result, the vertical blanking interval of the video signal cannot be used by the head end operator to insert other text data such as sports, weather, stock market, news, advertising and the like. An improved text data transmission technique is desired whereby such general text data may be inserted into the video signal at the cable head end for transmission to the viewer.

It is also known in the art to provide an electronic program guide (EPG) which provides the viewer with an on-screen listing of the upcoming television programs on the cable television channels available to the viewer. Typically, the EPG is provided by an EPG data service and the EPG data is converted into a video signal at the cable head end and transmitted to the viewer's television via a dedicated cable television channel. After tuning to the dedicated cable television channel, the viewer then must passively wait until the programming for the desired time period is displayed. In other words, this technique provides no mechanism for allowing the viewer to scroll through the EPG to the desired listing. Moreover, this technique also requires the cable head end operator to dedicate a separate cable television channel to the EPG data and to create video signals from the EPG data provided by the EPG service providers.

These problems with the transmission of EPG data have been addressed in the prior art by modulating the EPG data onto an FM carrier and transmitting that FM carrier with a video signal on one of the cable television channels. A dedicated peripheral device provided at the viewer's television tuner demodulates the EPG data from the FM carrier and stores the EPG data until the viewer requests presentation of the EPG data on the viewer's television. Upon selection of the EPG data, the EPG is displayed on the viewer's television in place of the other video programming. Since the EPG data is stored locally at the viewer's television, the viewer may scroll through the listings in the EPG until the desired listing is reached. While this technique does not require a separate dedicated cable television channel for the transmission of the EPG and allows the user to scroll through the EPG, an improved EPG transmission technique is desired which can be integrated with the viewer's normal cable television tuner so that a separate peripheral device dedicated to reception of the EPG is not necessary. Also, it is desired that the EPG data transmission be combined with the text data transmission to maximize efficiency.

In addition, it is also known to amplitude modulate the audio carrier or to frequency modulate an out-of-band carrier with control and authorization information from the head end controller for transmission to the viewers' cable television tuners. However, it is desired that the transmission of the control and authorization information also be integrated with the text data and EPG data transmission so that a single common data transmission/reception scheme may be used.

The present invention has been designed to meet these needs in the art.

SUMMARY OF THE INVENTION

The present invention relates to a data controller which manages the flow of text data and electronic program guide (EPG) data to a cable television viewer. The data controller of the invention receives text data and EPG data from one or a plurality of local or remote data sources via a communications link, processes the received data in its internal database manager to perform data compression and the like, and then provides this text data and EPG data to the viewer under control of the head end controller. In a preferred embodiment, the text data and EPG data are inserted into the vertical blanking intervals of cable television channels to which the corresponding text data or EPG data has been assigned, and upon receipt at the viewer's television tuner, the text data and EPG data are extracted from the vertical blanking interval and displayed on the viewer's television. Hence, text channels and one or more EPG channels may be provided as "virtual channels" which do not require extra video bandwidth.

Preferably, the viewer's cable television tuner includes an EPG memory for storing the EPG data at the viewer's television tuner to allow the viewer to scroll through the stored EPG data to the desired listings. Also, a template memory is preferably provided at the tuner to provide a framework in which to display the EPG data. Also, the EPG data is formatted into transactions including display commands and the like so that the EPG data may be transmitted directly to the viewer's television tuner as data rather than video, thereby saving a substantial amount of bandwidth.

In addition, the text data is also formatted into transactions including display commands and the like and transmitted to the viewer's television tuner on a screen by screen basis with an appropriate delay between the presentation of each page as designated by the system controller. Such auto-pagination makes it unnecessary for the user to request the pages to scroll; however, manual pagination may be provided by using memory at the set top tuner for storing successive pages of text data.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

An electronic program guide (EPG) and text channel data controller which affords the above-mentioned and other beneficial features in accordance with a presently preferred exemplary embodiment of the invention will be described below with reference to FIGS. 1–7. Those skilled in the art will readily appreciate that the description given herein with respect to those figures is for explanatory purposes only and is not intended in any way to limit the scope of the invention. For example, while a cable television system is shown and described, the present invention may also be used in a satellite, over-the-air broadcast, subscription television system or other television system known in the art. Also, while the present invention is described for use in the provision of sports and weather text channels, those skilled in the art will appreciate that these text channels are only examples of the limitless types of text channels which may be provided to a viewer in accordance with the invention. Accordingly, any questions regarding the scope of the invention should be resolved by referring to the appended claims.

Figure 1:
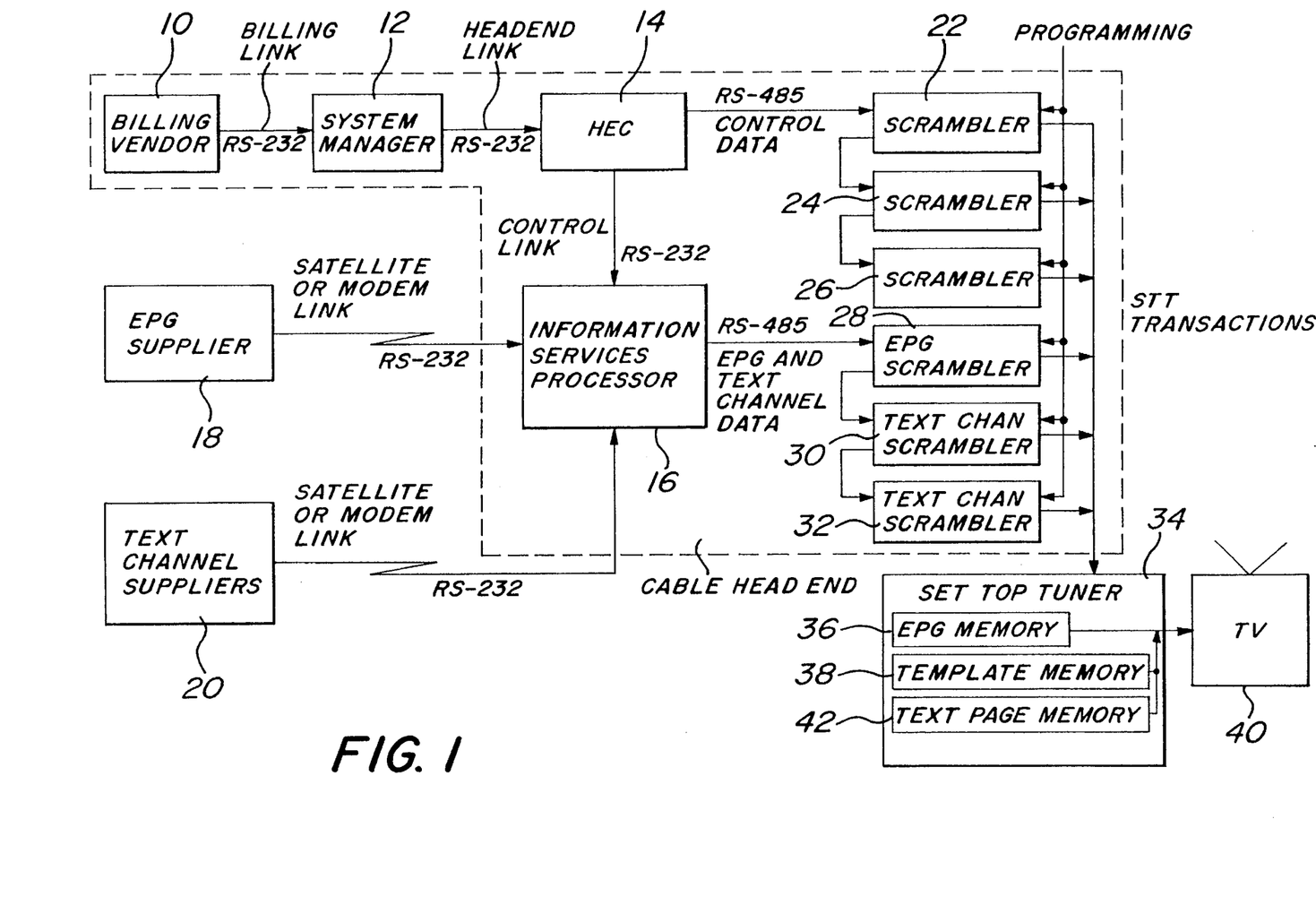
FIG. 1 is a block diagram of a system for providing EPG data and text data to a viewer in accordance with the invention.

FIG. 1 illustrates an EPG and text information service in accordance with the invention. As shown, the local cable television company's billing vendor 10 communicates via a billing link to an RS-232 port of a system manager 12 located at the cable head end. Billing vendor 10 includes a subscriber database and generates a monthly bill for the subscribers in the system based on the level of service and any pay-per-view purchases. Billing vendor 10 may comprise a personal computer or other data processing device known in the art. Billing vendor 10 informs system manager 12 as to which cable television subscribers are authorized to receive the available cable television channels. System manager 12 is also a personal computer or other processing device which receives viewer authorization transactions from billing vendor 10 and generates transactions for delivery to the distribution apparatus or the subscribers. Such transactions include text channel definition transactions which instruct the subscriber's tuner which group of channels it is entitled to receive, which frequency to tune for a particular text data channel, whether to mute the audio for that text channel, the pagination delay between pages, and the like.

System manager 12 also communicates via a head end link to an RS-232 port of a head end controller (HEC) 14 which controls the transmission of television programming to the subscribers. As will be described in more detail with respect to FIG. 2, HEC 14 communicates via a control link to an RS-232 port of an information services processor (or data controller) 16 which manages the flow of EPG and text data in accordance with the invention. As shown by dotted line in FIG. 1, information services processor (ISP) 16 is preferably located at the cable head end with system manager 12, HEC 14 and the signal scramblers. However, those skilled in the art will appreciate that all of the head end equipment need not be located at one site.

Figure 2:
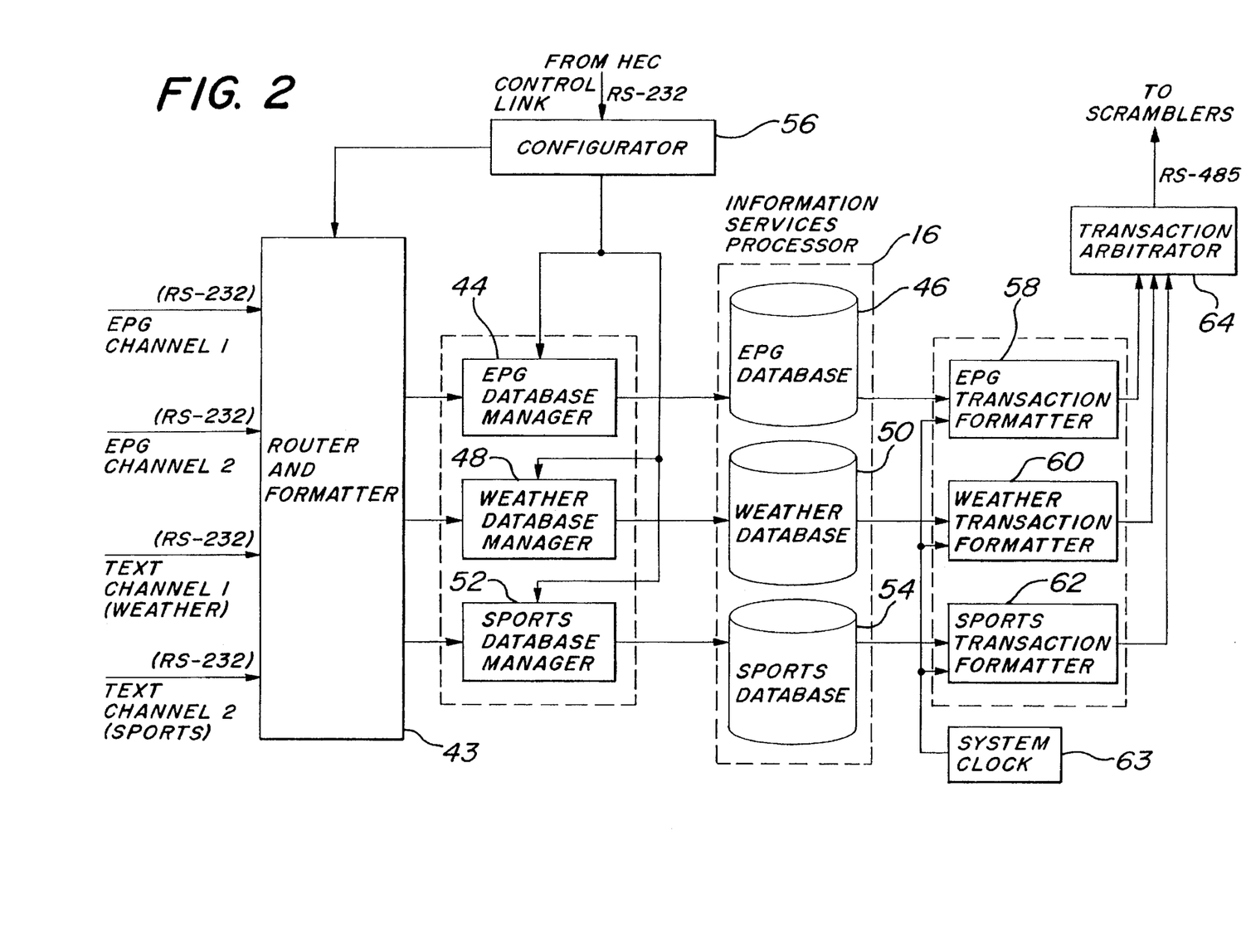
FIG. 2 illustrates a data controller for receiving the EPG data and text data from the data providers, appropriately formatting that data for display, and inserting the data into the vertical blanking interval of a cable television channel to which the data is assigned for transmission to the viewer.

As shown in FIG. 1, EPG data is supplied from one or more local or remote EPG suppliers 18 via a satellite link, modem link or other communication link to an RS-232 port of ISP 16. Similarly, text data from one or more text channel suppliers 20 is provided via a satellite link, modem link, or other communication link to another RS-232 port of ISP 16. In preferred embodiments, ISP 16 has a plurality of identical RS-232 ports for accepting data from a plurality of EPG suppliers 18 and text channel suppliers 20. Also, as shown, one of these RS-232 ports is preferably used for a control link to HEC 14 as well. As will be described in more detail below with respect to FIG. 2, ISP 16 manages EPG and text source databases in response to control signals from HEC 14 in order to provide EPG data and/or text channel data to selected viewers.

As shown in FIG. 1, HEC 14 also provides control data directly to the viewer's television tuner via an RS-485 output port. Preferably, the control data from HEC 14 includes the aforementioned text channel definition transactions as well as EPG definition transactions for instructing the tuner at which frequency to tune for the EPG data and the like. The control data may also include software for downloading into the viewer's tuner for reprogramming the viewer's tuner as necessary. In a preferred embodiment, the control data from HEC 14 is inserted into the vertical blanking interval of the selected cable television signal by daisy-chained scramblers 22, 24 and 26 using known in-band techniques, although the control data from HEC 14 may also be modulated on an out-of-band carrier or an in-band audio carrier for transmission as described in related U.S. patent application Ser. No. 07/983,766, filed Dec. 1, 1992 and assigned to the present assignee, the contents of which are hereby incorporated by reference. Preferably, scramblers 22–26 are daisy-chained so that the scramblers may be addressed individually or globally.

Similarly, EPG data and text channel data from ISP 16 are provided to the viewer's television tuner via an RS-485 output port of ISP 16. EPG data and text channel data are similarly inserted into the vertical blanking intervals of selected cable television signals by EPG scrambler 28 and text channel scramblers 30 and 32, respectively, using, for example, the in-band vertical blanking interval insertion techniques described in the aforementioned patent application Ser. No. 07/983,766 filed Dec. 1, 1992. Of course, if desired, scramblers 22–32 may insert the control data, EPG data, and text channel data into other portions of the video signals such as the horizontal blanking intervals or else replace the video entirely. Those skilled in the art will also appreciate that a number of scramblers may be provided in accordance with the volume of data received from HEC 14 and ISP 16. Typically, however, the number of scramblers depends on the number of premium channels for which scrambling is used.

Preferably, EPG scrambler 28 and text channel scramblers 30 and 32 are identical to control data scramblers 22–26 and are similarly daisy-chained for individual or global addressing. As shown in FIG. 1, scramblers 28–32 receive a single serial data channel which carries the combined EPG data and text data and display control transactions (to be described in more detail with respect to FIG. 2) for all data streams in use. Each scrambler is also equipped with memory for storing a predetermined amount of this data in an internal memory so as to minimize the number of database accesses. Preferably, scramblers 28–32 have internal memory sufficient to store a significant number of transactions. For example, scrambler 30 may have enough internal memory to score a day's sports scores for display on a sports text channel. The data received and stored in scramblers 28–32 is preferably in RS-485 format, and the protocol in a preferred embodiment is SDLC. All data transactions to scramblers 28–32 are sent on individual data streams specifying the target scrambler (station addresses in SDLC protocol), and the control data is sent on a global data stream which is filtered in the scramblers 28–32 based on the address of the scrambler so that the data streams can be configured by a transaction from ISP 16. The individual EPG data and text data streams are preferably generic in the scramblers so that they can be allocated as desired. Preferably, scramblers 28–32 have baud rates of at least 9600.

Preferably, the subscriber's tuner is a set top tuner 34 which comprises an EPG memory 36 for storing the EPG data from ISP 16. For example, EPG memory 36 may store one or two weeks of EPG data for selective access by the viewer via a menu of the set top tuner 34. This menu preferably allows the viewer to scroll through the EPG data stored in EPG memory 36 using the key pads of the viewer's television remote control device. Set top tuner 34 may also comprise a nonvolatile template memory 38 for storing the template in which the EPG data is to be inserted for display to the viewer on the viewer's television 40. In this manner, a video signal containing the template display data need not be continuously retransmitted to the set top tuner 34, thereby saving more bandwidth. Instead, the EPG data only needs to be updated every 30 minutes or when there is a program change. Of course, different set top tuners 34 may have varied amounts of memory and processing capabilities for such purposes in accordance with the acceptable memory costs during manufacture of the set top tuner 34.

As shown in FIG. 1, set top tuner 34 may also comprise a text data memory 42 for storing a page of text data for presentation to the screen. Thus, while one page of text data is displayed to the subscriber, the next page of text data may be loaded into the text data memory 42.

As noted above, ISP 16 of the invention manages the flow of text data and EPG data from the data service provider to the viewer's set top tuner 34. ISP 16 manages this data by accepting data only from one or more authorized text data and/or EPG data sources, processing the text data and EPG data in its internal database manager, and formatting the processed data into a common data transaction format for output to the scramblers for transmission to the set top tuner 34. Provision of EPG data and text data to the subscribers is controlled by the head end controller 14 via the control link as will be described in more detail below.

In a preferred embodiment, ISP 16 comprises an IBM PS2 model 7546 personal computer having a plurality of RS-232 serial input ports for EPG data and/or text data inputs and at least one RS-485 HDLC serial link at its output of the type used by HEC 14. As shown in FIG. 1, the control link will be a single RS-232 serial port. The hardware and software components of ISP 16 are then configured as illustrated in FIG. 2.

As shown in FIG. 2, ISP 16 preferably comprises a plurality of RS-232 ports which provide a common interface for the EPG data and text channel data asynchronously provided by the EPG supplier(s) 18 and text channel suppliers 20. The EPG data and text channel data is transmitted to ISP 16 via a satellite link (when the interface is operated in simplex mode) or by modem (when the interface is operated in half duplex mode). Preferably, the data is transmitted at a baud rate of at least 1200.

ISP 16 functions as a "gate keeper" which only allows access by authorized data sources. Accordingly, when ISP 16 receives a message from an EPG supplier 18 or a text channel supplier 20, it first checks the data for authorization. If that supplier is not authorized, the data is ignored. On the other hand, if the supplier is authorized to access ISP 16, ISP 16 performs the requested action and returns a command response message. If the communications link is simplex, the response is ignored. Hence, access to ISP 16 is limited by authorization codes, but as will be described below, access is also limited by whether the data provider provides the EPG data or text data in the transmission protocol expected by ISP 16.

In particular, messages sent between an EPG supplier 18 or a text channel supplier 20 and ISP 16 are preferably formatted to include a start of text byte, a data block of ASCII characters, checksum bytes and an ASCII carriage return. This format is used in commands sent to ISP 16 from the data suppliers as well as in responses sent to the data suppliers. As known by those skilled in the art, the checksum verifies proper message transmission by comparing the checksum in the message with an internally computed checksum. Preferably, the checksum is a two byte CRC of all bytes in the message field beginning with the first character following the start of text character up to but not including the checksum field. The checksum is transmitted in the message as the hexadecimal ASCII representation (four bytes) of the CRC computation. The data blocks, on the other hand, are configured differently depending upon whether the input data is EPG data or text data.

EPG data from the EPG supplier 18 is formatted in accordance with an EPG command set including, for example, a Define Program Command which is used to identify all data relating to a single program, a Define Category Command which is used to establish a category for identifying different types of programs, and a Delete Category Command which is used to delete an unused category to make room in the database of ISP 16 for new programming categories. The EPG data is formatted on a "per program" basis by these commands. An example of a presently preferred format for a Define Program Command is as follows:

| Define Program Command | |
|---|---|
| Byte | Description |
| 1–2 | Command Code |
| 3–4 | Service Provider |
| | 02 - EPG Supplier No. 1 |
| | 03 - EPG Supplier No. 2 |
| | 04 - EPG Supplier No. 3 |
| | 10 - System Manager |
| | 20 - Local Origination |
| 5–7 | Type of Service |
| | 001 - EPG |
| | (001–099 National Services) |
| | (100–199 System Manager Services) |
| | (200–299 Local Origination Services) |
| | (300–399 Other Services) |
| 8–13 | Authorization Code From Supplier |
| 14–19 | Starting Date (e.g., 112292 = 11/22/92) |
| 20–25 | Starting Time (e.g., 123045 = 12:30:45) |
| 26–29 | Program Identifier (e.g. WTBS) |
| 30–32 | Duration (e.g., 135 = 1 hour and 35 minutes) |
| 33 | MPAA Rating (0 = No Rating, 1 = G, 2 = NR, 3 = PG, 4 = PG13, 5 = R, 6 = X, 7 = NC17) |
| 34 | Critique Number of * given by movie critic) |
| 35–36 | Category Identification |
| 37–38 | Attribute Bit Map |
| | 0-1 = Stereo |
| | 1-1 = Black and White |
| | 2-1 = Closed Captioned |
| | 3-1 = Bilingual |
| | 4-1 = Spanish |
| 39–40 | Traits Bit Map |
| | 0-1 = Profanity |
| | 1-1 = Nudity |
| | 2-1 = Violence |
| | 3-1 = Adult Situations |
| | 4-1 = Adult Theme |
| | 5-1 = Adult Language |
| 41– | Title and Program Description blocks |

Delimiter characters are used for variable length fields such as the title and program description blocks to identify the length of the field. For example, a NUL (0 hexadecimal) means the field is null, SOH (1 hexadecimal) means the field is valid, and ETX (3 hexadecimal) means the end of the current record.

In a preferred embodiment, each program's record includes two lines of characters with up to 9 characters per line for a half hour program title block (the EPG display area is 9 characters by 2 lines for a half hour program), two lines of characters with up to 19 characters per line for a one or more hour title block (the EPG display area is 19 characters by 2 lines for a 1 hour program), and three lines of characters with up to 40 characters per line for a program description describing the program corresponding to the current record. Those skilled in the art will appreciate that half hour shows need not have a one hour program title block but that shows having a duration of one hour or more should have a short and long title block since the EPG data is scrolled on the screen and does not always permit the display of an entire long title for a program at the edge of the time frame of the EPG on the display. Of course, these blocks may have different sizes and may be filled by the appropriate delimiter if no text is available.

Once data transmitted with a Define Program Command is stored in an EPG database of ISP 16, the EPG data is formatted into transactions for transmission to the set top tuner 34 as will be described in more detail below. This command may also be used to update a program definition since it will overwrite a corresponding entry in the EPG database of ISP 16. As noted above, the EPG data is preferably updated at least every 30 minutes on the half hour and also when changes are made to the data.

The Define Category Command also is formatted to have a command code, service provider, and type of service in bytes 1–7. However, the Define Category Command preferably has category identification data in bytes 8–9 and a category name having up to 21 bytes starting at byte 10. Once again, a delimiter is preferably used to mark the end of the field. In a preferred embodiment, up to 99 different categories may be defined using this command. Any categories beyond 99 will be ignored. Categories should thus be deleted to make room for new ones. The Delete Category Command is similarly formatted except that it is not necessary to specify the category name the category ID is sufficient to specify a category to be deleted.

ISP 16 may respond to such commands from the EPG supplier 18 by sending an appropriate response such as: no error (normal response), service provider not found (not authorized), type of service not found (not authorized), category ID not found, unrecognized command, checksum error, insufficient disk space, and the like. Of course, other EPG commands and command responses may be provided as desired. The above commands were merely described by way of example. However, it is important that any commands have a format known only to the authorized service providers in order to maintain system security.

The text channel data, on the other hand, may originate from many different text channel suppliers 20 and may arrive at the ISP 16 via many different communications links such as satellite, dial up modem, direct connect modem or via direct connect to the system manager 12. Preferably, the text data is also supplied to the ISP 16 via an RS-232 port identical to that used for receiving the EPG data, and messages between the text channel supplier 20 and ISP 16 have the same general format and transmission characteristics as described above with respect to the EPG data except that the data blocks are formatted differently.

In particular, in a preferred embodiment each text channel consists of one or more text screens, where each text screen is comprised of 16 lines by either 24 or 45 characters per line depending upon the size of each character. Unlike the EPG data, the text data is not provided on a program basis. Rather, the text data is provided for each line of text on a text screen basis where one line of text is transmitted in each text data block. Preferably, the text channel suppliers 20 provide the text data by defining text screens using a command formatted as follows:

| Define Text Screen | |
|---|---|
| Byte | Description |
| 1–2 | Command Code |
| 3–4 | Service Provider |
| | 02 - Text Supplier No. 1 |
| | 03 - Text Supplier No. 2 |
| | 04 - Text Supplier No. 3 |
| | 10 - System Manager |
| | 20 - Local Origination |
| 5–7 | Type of Service |
| | 001 - EPG |

-continued

Define Text Screen

| Byte | Description |
|---|---|
|  | 002 - Sports |
|  | 003 - Weather |
|  | 004–099 Other Text Service |
|  | (001–099 National Services) |
|  | (100–199 System Manager Services) |
|  | (200–299 Local Origination Services) |
|  | (300–399 Other Services) |
| 8–13 | Authorization Code From Supplier |
| 14–15 | Page # |
| 16–17 | Line # (1–16) |
| 18 | Justification |
|  | 0 - Centered |
|  | 1 - Right |
|  | 2 - Left |
| 19–20 | Color |
| 21 | Character Size |
|  | 0 - Normal (45 Characters per line) |
|  | 1 - Large (24 Characters per line) |
| 22–?? | Text   45 or 24 Bytes Max depending on Character Size |
| ?? | SOH (01 Hex) End of Line Delimiter |

All bytes after byte 16 are repeated for each line of text until a complete page has been sent. The page number is then updated in bytes 14–15 and the next page sent to ISP 16 for storage in the appropriate text database. As with the EPG data, the above-mentioned response codes may also be provided to the text channel supplier 20 which transmitted the text data to ISP 16. The structure of ISP 16 will now be described with respect to FIG. 2.

ISP 16 primarily comprises a plurality of databases and database managers. As shown in FIG. 2, there are essentially two types of databases maintained in ISP 16—one type for EPG data and one type for text channel data. The EPG database is designed to collect data from each EPG supplier and to sort each EPG program record by channel and time of day. A separate database is created for each text channel for collecting text data from the associated text channel supplier 20 and formatting the received text data for transmission on individual text channels using the techniques to be described below. Each database that is created is identified by the service provider and type of service codes listed in the Define Program Command for use in the control link commands provided to ISP 16 from HEC 14.

As shown in FIG. 2, a received command is checked for its command code, the service provider, type of service and authorization code, as appropriate, by router and formatter 43. If the command is from an unauthorized data source, the subsequent data is ignored. However, if the received data is from an authorized supplier, router and formatter 43 routes the data to the appropriate database within ISP 16. For example, if EPG data is received, it is routed via EPG database manager 44 to EPG database 46. On the other hand, if the received data is text data from a weather service, the weather data is routed via weather database manager 48 to weather database 50. Similarly, if the received data is text data from a sports service, the sports data is routed via sports database manager 52 to sports database 54. Those skilled in the art will appreciate that a single database manager may perform the function of the separate database managers as indicated by dotted line in FIG. 2. Also, those skilled in the art will appreciate that the separate databases may be implemented on the hard disk of the storage means of ISP 16 as also indicated by dotted line in FIG. 2.

In a preferred embodiment, EPG database manager 44 sorts the received EPG data by channel and time of day and stores the received EPG data in the appropriate location in EPG database 46 for later recall. EPG database manager 44 may also perform garbage collection on the EPG database 46 as records are deleted. EPG database manager 44 may also call a data compression software routine such as the Huffman Compression Algorithm which, as known to those skilled in the art, maps more frequently used characters to fewer bits than the usual eight bits used in normal ASCII, while giving the less frequently used characters more bits. The number of bits used for a character is based on its probability of appearing in the data stream. Huffman encoding is described in detail in an article entitled "Lossless Data Compression", *Byte*, March, 1991, pp. 309–314. Such a routine is desired to maximize storage efficiency at EPG database 46. Similarly, each text database manager stores the text information in the associated text database and performs data compression.

Router and formatter 43 and database managers 44, 48 and 52 are all controlled by configurator 56, which is, in turn, responsive to control data from HEC 14. Configurator 56 responds to control commands from HEC 14 to provide updated authorization information to router and formatter 43 for comparison with the incoming data and for adding/subtracting database managers and databases and the like as EPG suppliers 18 and text channel suppliers 20 are added and subtracted from the system.

As noted above, access to ISP 16 is carefully controlled through the use of authorization codes. In addition, ISP 16 maintains control over the information services provided to the viewer by storing the EPG data and text data in a particular format in the appropriate database within ISP 16. For example, the EPG database may store the data in a particular binary tree format. Since the speed of the EPG database is not an issue in accordance with the invention (because the EPG database only needs to be able to read and write a number of records equal to the total number of channels in the cable system once every half an hour), a simple binary tree database has been used in a preferred embodiment. Such an EPG database will be stored on a hard disk drive of ISP 16. Preferably, the first 4 bytes stored on the hard disk drive will contain the file offset of the root node and the database records will follow. Each database record will contain, in addition to the required data, a left branch file offset and a right branch file offset. The left branch file offset points to the records with keys less than the current record, while the right branch file offset points to the records with keys greater than the current record. The database will use the program data and time and channel number as their key. For fastest access, those skilled in the art will appreciate that it is important to keep the database tree balanced.

Figure 3:
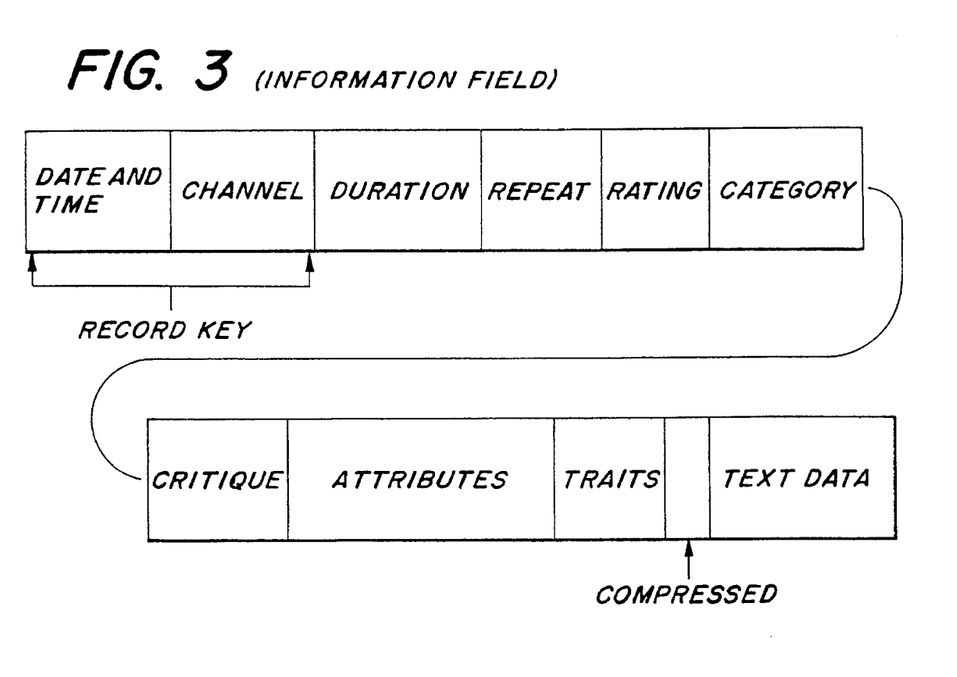
FIG. 3 illustrates the information field of the EPG data read from the EPG database of FIG. 2.

In a preferred embodiment, the EPG database records are formatted such that the left branch appears first, then the right branch, the record key data and then the non-key record data. As shown in FIG. 3, the EPG database key is a combination of the date and time field and the channel number from the EPG data. Following these fields are the duration field, the repeat field, the program rating field, the program category field, the critique field, the attributes flag field, the program traits flag field, the text data compressed flag and lastly the text data. Preferably, the text data field further consists of several optional subfields with a delimiter between each field. As noted above, the subfields preferably include the short program title line 1, the short program title line 2, the long program title line 1, the long program title line 2, and three lines of program description.

EPG database manager 44 accesses the EPG database 46 through shared library routines such as add a record, delete a record, read a record, and the like. In other words, an application program does not access the EPG database 46 directly. In a preferred embodiment, the EPG database 46 also uses a semaphore to disallow more than one process thread (EPG database manager 44 and EPG transaction formatter 58) from changing at any given time. As the EPG database 46 is used, it is fragmented as records are added and deleted, and as a result, EPG database manager 44 preferably further includes garbage collection routines for periodically performing the garbage collection function on the EPG database 46. The text databases are similarly configured except that garbage collection is not necessary.

EPG transaction formatter 58 reads the database records of EPG database 46 and formats them into program-based transactions having a predetermined number of bytes which are transmitted to the EPG scrambler 28 for insertion into the vertical blanking interval of a video signal and transmission to the set top tuner 34. These transactions are then sent via a transaction arbitrator 64 to the EPG scrambler 28 shown in FIG. 1 for insertion into the appropriate video channel. Similarly, weather transaction formatter 60 and sports transaction formatter 62 read the database records of weather database 50 and sports database 54, respectively, and formats the text data into text screen-based transactions which may be inserted into the vertical blanking interval of a video signal. Preferably, at least one transaction is inserted into a vertical blanking interval of each field of a video signal. It has been found that 22 bytes per transaction is a convenient transaction size to allow a transaction to fit into a vertical blanking interval of a field in this manner. In addition, the current time and date may be obtained from ISP system clock 63 to assure that the appropriate EPG programs are sent in the appropriate time slots.

The transactions from transaction arbitrator 64 are output to a single RS-485 output port of ISP 16 which is connected to multiple scramblers of the type used to scramble premium cable channels. The transactions are segmented into EPG data and text data streams for transmission to the EPG scrambler 28 (if the transaction includes EPG data) or to the text channel scramblers 30 and 32 (if the transaction includes text data). In a preferred embodiment, EPG transaction formatter 58 also tags the EPG transactions as Long Term or Short Term as they are transmitted to the EPG scrambler 28. EPG Short Term and Long Term data differ only in the timeliness of the information they provide to the set top tuner 34. Short Term data can be specified by HEC 14 via the control link to be anywhere from 1 to 255 hours of EPG data. The function of this Short Term data stream is to provide a quick refresh of the most immediate portion of the EPG data stored in EPG memory 36 of the set top tuner 34. Long Term data, on the other hand, consists of the remaining EPG data. The maximum time for the Long Term EPG data may also be specified by HEC 14 via the control link to be anywhere from 1 to 4096 hours, for example.

Figure 4:
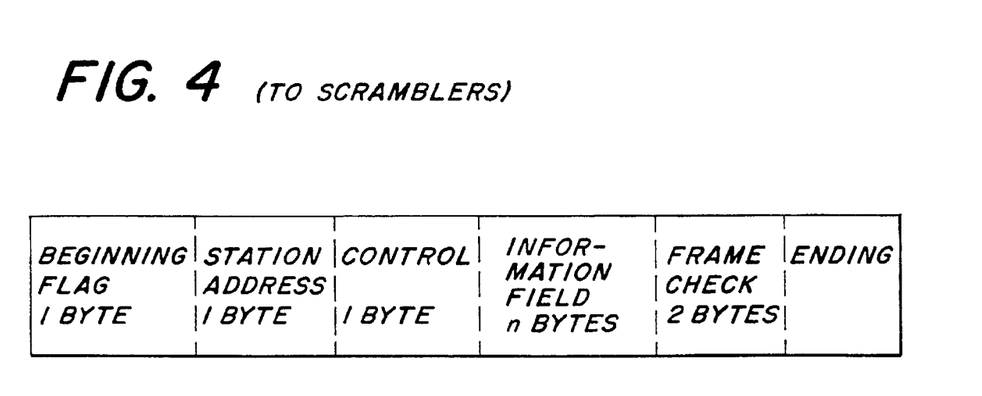
FIG. 4 illustrates the data format of data read from the database for insertion into the assigned cable television channel.

The EPG transactions generated by EPG transaction formatter 58 are formatted into SDLC frames as noted above. A sample SDLC format for the EPG transaction data is shown in FIG. 4. In FIG. 4, the beginning flag delineates the beginning of the SDLC frame, the station address delineates the scrambler to be addressed, the control byte is a command code that defines what is to be processed, the information field contains the EPG data formatted as in FIG. 3, the frame check contains the CRC for all data between the beginning and ending flags, and the ending flag delineates the end of the SDLC frame. A transmission from EPG transaction formatter 58 will address a specific data stream and a response from the EPG scrambler 28 will identify its data stream in the station address location. As noted above, such transmissions may or may not require a response from the EPG scrambler 28.

The EPG transactions typically include an Add EPG Block command including a byte specifying that the following data is from the EPG data stream, a control code byte specifying, for example, whether a reply from the scrambler is expected, two bytes setting forth the EPG data block number, a flag setting forth whether the EPG data is Short Term or Long Term data, the number of transactions which make up the EPG data block, and the actual transactions. EPG transaction formatter 58 may also generate a Delete EPG Block command which specifies that the data is to be deleted from the EPG data stream, the control code byte, and the EPG block number to be deleted. These two transaction types for Long Term and Short Term EPG data may be used together to form a block of EPG data for insertion into the vertical blanking interval of a video signal. As noted above, the EPG data block preferably defines all of the information for a single program at a specific time, such as short and long titles and three lines of program description.

Figure 5:
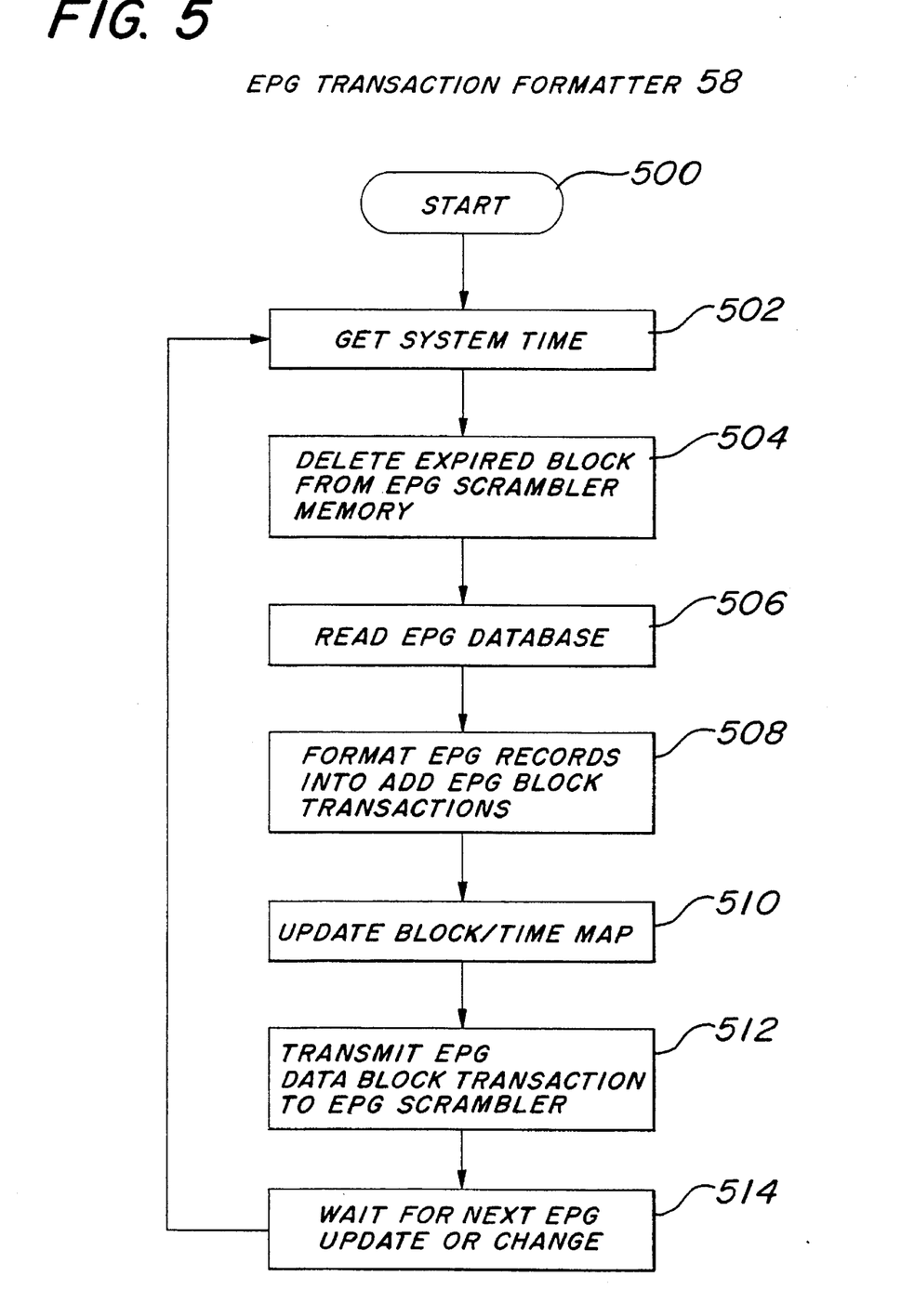
FIG. 5 is a flow chart illustrating the operation of the EPG transaction formatter of FIG. 2.

FIG. 5 illustrates a flow chart for the software embodied in EPG transaction formatter 58. As shown, the software starts at step 500 and gets the system time and date from the ISP system clock 63 at step 502. An expired EPG data block is then deleted from the memory of the EPG scrambler 28 at step 504. An expired EPG data block is defined as a data block representing a program which has been completely aired prior to the current system time or a program which was aired before the time window used for the EPG. At step 506, current EPG data blocks having a time and date within the EPG time window are read from the EPG database 46. The current EPG data blocks are then formatted into Add EPG Block commands and associated transactions at step 508. A block/time map of EPG transaction formatter 58 is then updated at step 510. The block/time map preferably stores the time that each EPG data block was sent to EPG scrambler 28. The transactions representing the EPG data are then transmitted to the EPG scrambler 28 at step 512. EPG transaction formatter 58 then waits at step 514 for the next EPG update (which should occur when the system time enters a new half hour) or the next EPG change (which may occur at any time). Upon receipt of such an update or change, control returns to step 502.

Text transaction formatters 60 and 62 similarly generate text transactions for the text data, which as noted above, is defined on a per screen (rather than per program) basis. Hence, an Add Text Screen command is similar to an Add EPG Block command except that the text channel number and screen number are provided in place of the EPG block number and Short Term/Long Term data bytes. The text transaction formatters 60 and 62 may also request the time from the scrambler so that proper pagination may be maintained.

Figure 6:
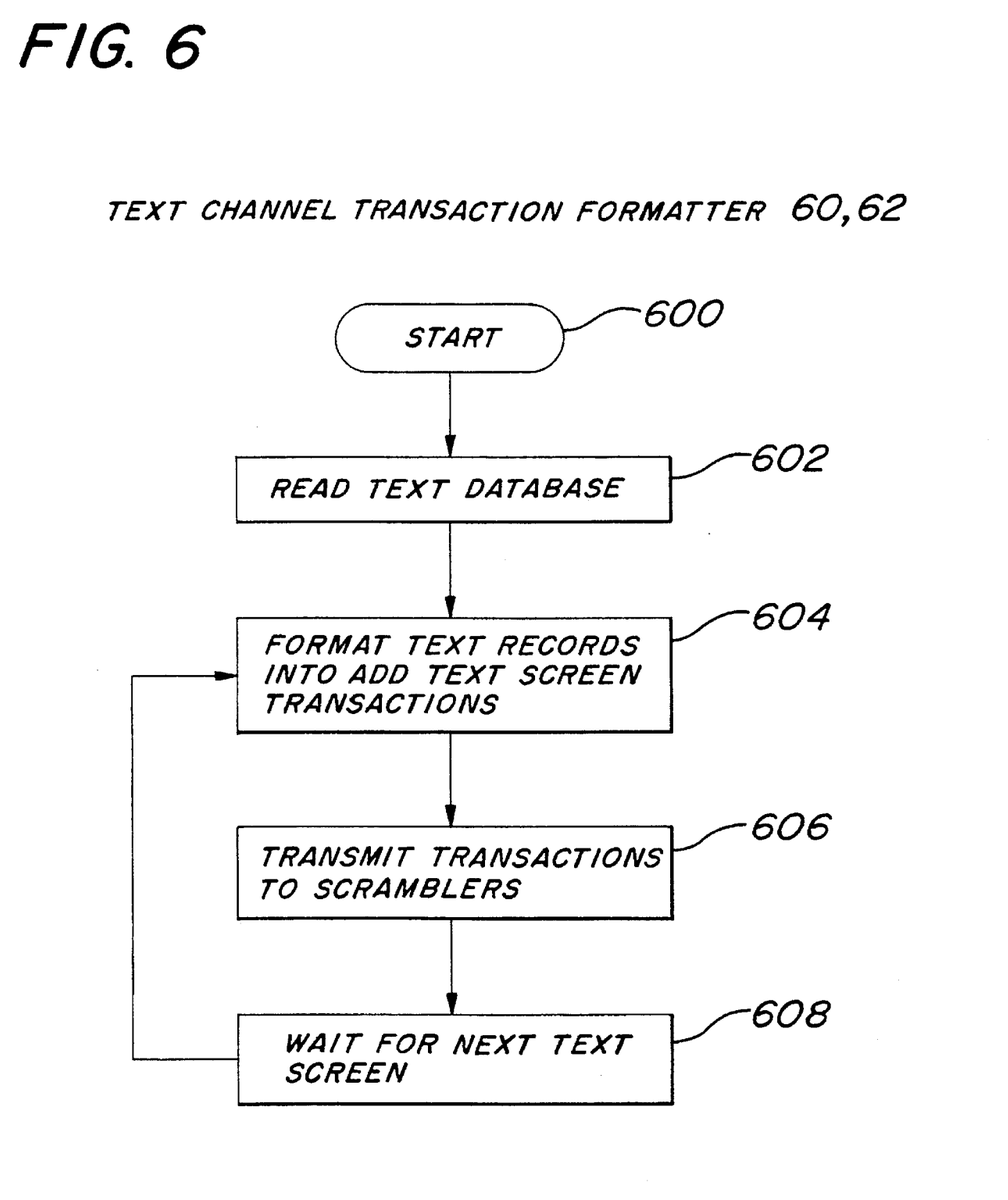
FIG. 6 is a flow chart illustrating the operation of the text transaction formatters of FIG. 2.

FIG. 6 illustrates a flow chart for the software embodied in text channel transaction formatters 60, 62. As shown, the software starts at step 600 and reads a text screen record from the text database 50 or 54 at step 602. At step 604, the text screen is formatted into Add Text Screen transactions for transmission to the text channel scramblers 30, 32 at step 606. Preferably, such transactions are formatted such that the display characters are sent as display commands rather than as separate characters for every display coordinate of the text display screen. Then, at step 608, text transaction formatter 60, 62 waits a period of time specified by system manager 12 (if auto-pagination is used) before the next text page is formatted and transmitted to the text channel scramblers 30, 32. At the end of this period of time, control returns to step 604 and the next text screen record in the text database 50, 54 is formatted for transmission to text scramblers 30, 32 for insertion in the vertical blanking interval of a particular video signal.

Typically, text data is passed to the screen by sending a separate character for each display location of a page. In other words, if a text screen comprises 16 lines and 24 characters per line, a text screen is represented by sending 384 (24×16) characters, one for each display location for that display screen. A blank space character is sent to indicate that no character is present in a particular text screen location. Hence, even if a single word is displayed for a text screen, 384 characters are transmitted for display. This results in a great waste of bandwidth and transmission time, and accordingly, the present inventors send the text data to the screen as display transactions including display commands which generate the text data at the set top tuners 34. In this manner, it is unnecessary to send a byte for every address of the text screen of the display.

In particular, the text data is transmitted to the screen along with appropriate commands for controlling the display of the text data. For example, a first display command in a sequence identifies the following data as text data and instructs the set top tuner 34 to fill the television screen with a blue background or some other background or template over which the text will be displayed. The text data is then converted into a series of commands which together identify the separate screens of text. As noted above, the text data is grouped on a per screen basis, which allows the appropriate delay mechanism to be incorporated into the display commands to provide the necessary delay between the presentation of respective text screens.

For this purpose, transaction formatters 60 and 62 preferably include software for scanning the text data for actual characters, skipping extra spaces in the text data, and grouping the actual text for transmission in transactions of a designated size which will fit in the vertical blanking interval of a field of a video signal. Since spaces are eliminated, the display commands include a coordinate specifying the row and column address of the first display character on the screen and a number of contiguous characters follow that character in the same transaction until the transaction is filled or a number of successive spaces are encountered. Attribute information such as underline, blinking, or luminance inversion associated with the characters may also be transmitted using these display commands. These display commands are used to read the text data for a text screen from the appropriate database, and at the end of the text data for a text screen, a display command is transmitted to indicate that all data for that text screen has been transmitted. The transaction formatter 60, 62 also includes a wait loop or "timeout" command at the end of the transmission which builds in a delay (on the order of 7 seconds) which gives the viewer sufficient time to view a text screen before the text data for the next text screen is displayed, thereby providing auto-pagination of the text screen.

Auto-pagination permits the viewer to automatically advance from one text screen to the next without any intervention by the viewer. In accordance with the auto-pagination scheme of the invention, the cable operator can specify the time duration between screens and forward this information to the transaction formatters 60, 62. Then, during operation, when the viewer selects a text channel, the current page of text data is displayed by extracting the selected text channel data from the vertical blanking interval of the video signal in which it is inserted and mapping that text data to a channel of the viewer's television which is designated for display of that text channel. The next screen of text data will be displayed after a predetermined delay which gives the viewer sufficient time to read the displayed text data for the current screen (approximately 7 seconds). This technique could replace the commonly used "barker" channel which uses a computer to generate text data which is then transmitted as a complete video channel over the cable television system.

As noted above, configurator 56 responds to control commands from HEC 14 to provide updated authorization information to router and formatter 43 for comparison with the incoming data and to add/subtract database managers and databases and the like as EPG suppliers 18 and text channel suppliers 20 are added and subtracted from the system. The control link between HEC 14 and configurator 56 is also used to report the status of the ISP 16 to system manager 12. Also, if desired, the control link may accept text data from system manager 12 for displaying system messages and the like.

The interface between the configurator 56 and HEC 14 is an RS-232 port with a data format fixed at, for example, 9600 baud. All control data is preferably transmitted as ASCII characters. Upon receipt of a message from HEC 14, configurator 56 checks the data, performs the requested action, and returns a command response message in a message format of the type described above for communications between router and formatter 43 and the EPG and text channel suppliers. Sample commands sent from HEC 14 to configurator 56 over the control link include a Set Date and Time command (for synchronization purposes), Request Configuration commands, Request Status commands, Get Category Record commands, Scrambler Control commands, and Database Control commands.

During operation, ISP 16 monitors all input ports for data from the EPG and text data service providers and builds a list of all available EPG and text data services. This list is sent to the system manager 12 using a Request Configuration command. This command specifies the available service providers, the type of service (EPG or text data) from each provider, the communications port associated with each provider, the scrambler address or data stream (EPG or text data) for each service, the authorization code from the supplier for each service, the time and date of the last update from the service provider, the time and date of the last update to the scramblers, the time and date of the latest EPG data in the EPG database, and the like. Such information is provided to the system manager 12 for each service provider when this command is given.

The Request Status command contains flags indicating whether there are errors present in the error log and if the category list has changed since the last Request Status command was received. Get Error Record and Get Category Record commands may then be used to extract the error and category information.

The configuration commands are separated into EPG and text service configuration commands. A Configure EPG Service command specifies the service provider, the type of service, whether the service is to be enabled or disabled, the authorization code from the EPG supplier 18, the scrambler data stream for Short Term data, the scrambler data stream for Long Term data, the length of the Short Term data in hours (1–255), and the length of the Long Term data in hours (1–4096). The Configure Text Service command, on the other hand, specifies the service provider, the type of service (weather, sports, etc.), whether this service is to be enabled or disabled, the authorization code from the text channel supplier 20, the scrambler address or data stream for the text data, the channel number, and the pagination delay time (in seconds) before the next page of text data is to replace the current page of text data on the screen for auto-pagination.

The scrambler control commands include, for example, a Rebuild Scrambler Memory command which is used when a scrambler is replaced and needs data to be reloaded in its memory and a Scrambler Configuration command for specifying the amount of scrambler memory in kbytes. As noted above, a scrambler preferably contains enough memory to store a day's worth of sports scores or a complete weather forecast and the like so that repeated accesses to weather database 50 and sports database 54 are not necessary.

The database control commands include, for example, a Clear Database command which is used to clear the database associated with a particular service and a Delete Database command which is used to delete the database associated with a particular service. Other database control commands such as a Download Category Map command may also be provided for establishing a list of the specified categories of program data in the EPG data.

Figure 7:
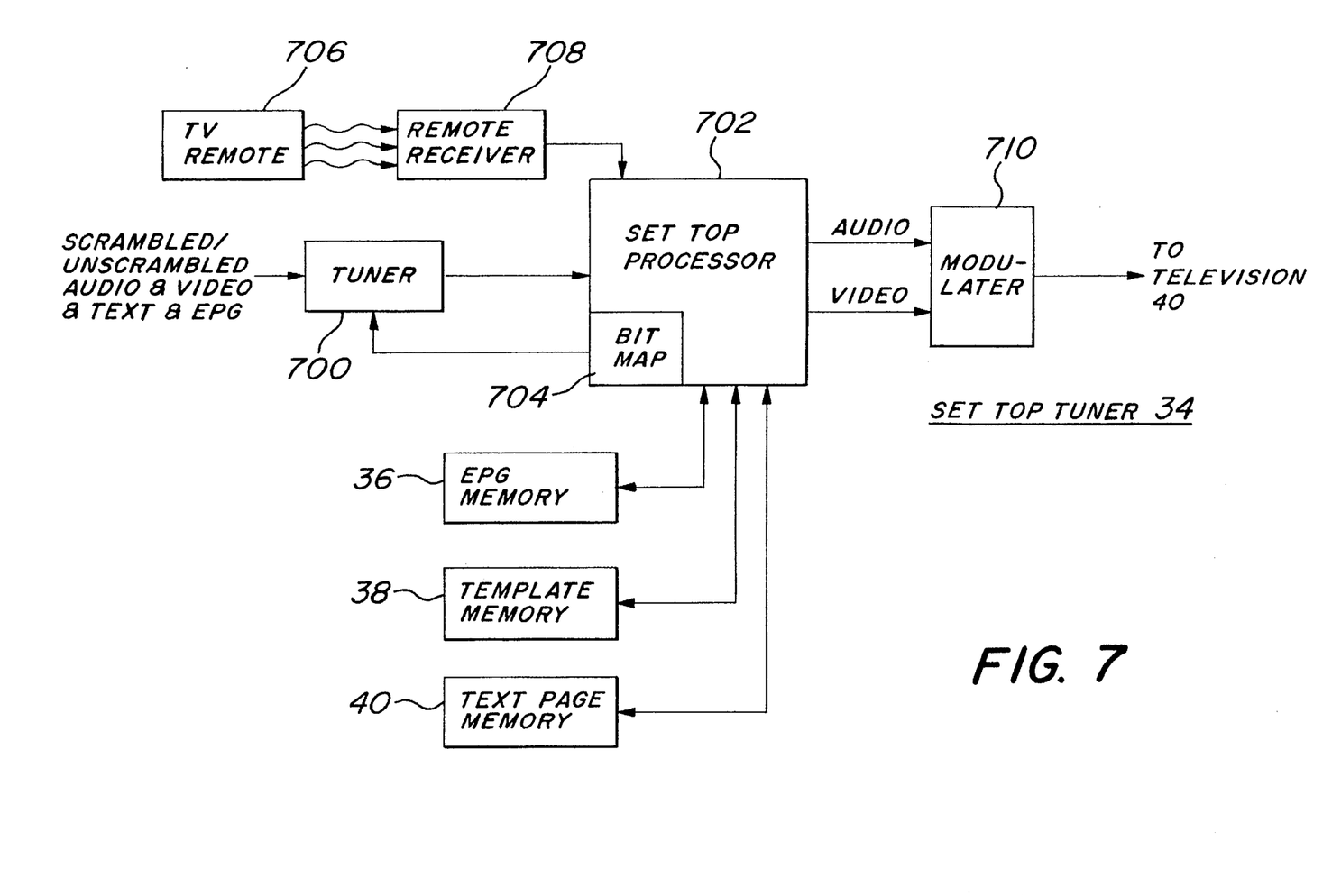
FIG. 7 illustrates a set top tuner for use in receiving text data and EPG data in accordance with the invention.

FIG. 7 illustrates a preferred embodiment of a set top tuner 34. As shown, set top tuner 34 comprises EPG memory 36, template memory 38, text page memory 42, a tuner 700, and a set top processor 702 which reads commands from the vertical blanking interval of the incoming video signal and performs the appropriate action. For example, if the incoming command is a text channel definition or EPG definition command from HEC 14, the appropriate update of bit map 704 is performed. Similarly, if the incoming command is a display command including EPG data, that data is stored in EPG memory 36 and is displayed with the template stored in template memory 38 when the user makes a menu selection via television remote control unit 706 and remote receiver 708 requesting display of the EPG data. Of course, the template data may be sent as part of EPG display commands if no template memory is provided. On the other hand, if the incoming command is a display command including text data, a page of that data is stored in text page memory 42 for presentation to the display a page at a time. The text page memory is either automatically updated every few seconds by virtue of the delay built into the display commands from the text formatters 60, 62 (if auto-pagination is enabled), or else the user is allowed to manually access the text data in the memory. If manual access is provided, it is preferred that the text page memory hold at least the currently displayed text page, the previous text page and the subsequent text page in order to give the user the ability to scroll through the text data. In either case, set top processor 702 preferably has the ability to request the next text page while the current page is being displayed so that the next text page is already loaded for display at the end of the screen delay time. The selected text, EPG or video signal is then modulated at modulator 710 for display on television screen 40 at the channel specified in bit map 704.

Bit map 704 of set top processor 702 of the set top tuner 34 maps the received text information to the designated cable channel for display by designating the frequency that must be tuned by tuner 700 to receive the desired text data. This information is received in the aforementioned text channel definition transactions from HEC 14. For example, the viewer may specify via television remote 706 that she wishes to view a sports text data channel which her program guide indicates to be available by tuning the set top tuner 34 to channel 181. Set top processor 702 then checks bit map 704 for channel 181 to determine that it must tune the frequency for channel 29 in order to extract the sports text data for the viewer's channel 181 from the vertical blanking interval of channel 29. Set top processor 702 then sets tuner 700 to tune channel 29 but the video signal for channel 29 is not displayed. Instead, the video screen is blanked by set top processor 702 and the text data extracted from the vertical blanking interval by set top processor 702 is displayed. Any necessary descrambling of the received video is performed by set top processor 702. The viewer thus perceives that many more "virtual" channels are available even though a separate video channel was not used to transmit the text data.

Applications for the text channels of the invention include the provision of a help or user's guide channel, a channel for alerting subscribers on cable system status, a stock market ticker, and the like using text provided by the system manager 12 or another text channel supplier. This text data is preferably displayed on a designated channel of the viewer's set top tuner 34. User's guide data, help data and the like is preferably scrolled through by the user using the keys on the television remote control device (auto-pagination is not particularly desirable for a text channel of this type).

In addition, text channels can be grouped for display whereby related subjects are displayed on adjacent channels of the set top tuner 34. For example, channel 181 could be used for football scores, 182 for hockey scores, 183 for baseball scores, 184 for basketball scores, and the like.

Although the present invention has been described with respect to particular embodiments, those skilled in the art will appreciate that the present invention may be modified without departing from the scope of the invention. For example, certain text channel data provided in accordance with the invention may be placed in premium or pay-per-view channels so that access to such text data may be restricted. Restricted text data could include personals and other adult oriented text data which parents may wish to restrict from their children or certain text data for which the cable operator may wish to charge an access fee. In addition, the EPG data and text data may also be transmitted in the horizontal blanking intervals of the video signals, on the audio carriers for each video channel, or even in place of some of the active video, if such is desired. Moreover, an interactive EPG may be designed whereby the user selects a program ID from the EPG and the processor of the set top tuner automatically tunes the frequency for the channel corresponding to that program ID. Accordingly, all such modifications are intended to be included within the scope of the invention as defined by the following claims.

We claim:

1. A system for controlling the presentation of text data from a text service provider to a customer's television display, comprising:

a database for storing text data from a plurality of sources of text data;

means for formatting text data stored in said database and associated display commands into transactions having a predetermined number of bytes, and for assigning each of said sources of text data to a unique video program channel for transmission to said customer's television display;

means for inserting said transactions into predetermined intervals of the unique video program channel to which text data in said transactions is assigned; and a text data receiver associated with said customer's television display which extracts said transactions from their unique video program channel and presents a screen of text data from said transactions to said customer's television display in accordance with said associated display commands in said transactions.

2. A system as in claim 1, wherein at least one of said sources of text data provides electronic program guide (EPG) data representing the video programs available for display on said customer's television display.

3. A system as in claim 1, wherein said sources of text data communicate with said database via a communications link.

4. A system as in claim 3, wherein said communications link comprises at least one of a satellite link and a modem link to said database.

5. A system as in claim 4, further comprising a data interface for providing common input ports for each of said sources of text data and for routing text data from each of said sources to said database.

6. A system as in claim 5, wherein said data interface operates in a simplex mode for transmissions from said satellite link and in a duplex mode for transmissions from said modem link.

7. A system as in claim 5, wherein said database is divided into a plurality of source databases, one source database for each source of text data.

8. A system as in claim 1, further comprising means for compressing data from said sources of text data prior to storage in said database.

9. A system as in claim 2, further comprising a database manager for authorizing access to said database, sorting received EPG data by assigned video program channel and time of day, and performing garbage collection on said database.

10. A system as in claim 7, wherein said formatting and assigning means assigns a source database to each new source of text data, controls said data interface to route text data from said new source to its source database, and updates access authorization to said source database for said new source of text data.

11. A system as in claim 1, wherein said predetermined intervals are vertical blanking intervals of the unique video program channel to which that text data is assigned and said inserting means inserts said transactions into said vertical blanking intervals of said unique video program channel.

12. A system as in claim 11, wherein said inserting means stores a number of transactions for creating a screen of text data on said television display and inserts said transactions into said vertical blanking intervals of said unique video program channel to which the source which produced the text data in said number of transactions is assigned.

13. A system as in claim 2, wherein said text data receiver comprises an EPG memory for storing EPG data representing the video programs available for display on said customer's television display over a predetermined interval of time.

14. A system as in claim 13, wherein said text data receiver further comprises a template memory for storing a video display template into which said EPG data is inserted for display on said customer's television display, said video display template representing a time grid for each authorized video programming channel in said EPG data which may be received by said customer's television display.

15. A system as in claim 14, wherein said text data receiver selectively accesses said EPG data in said EPG memory so as to allow said customer to scan through said EPG data.

16. A system as in claim 1, wherein said text data receiver comprises a text memory for storing at least a page of text data for presentation to said customer's television display.

17. A system as in claim 1, wherein said text data receiver comprises a bit map for correlating a designated channel on the customer's television display to a frequency which must be tuned to get the text data for the designated channel from a vertical blanking interval of the video program channel containing the text data for the designated channel.

18. A method of controlling presentation of text data from a text service provider to a customer's television display, comprising the steps of:

authorizing one of a plurality of sources of text data to access a source database for storage of text data from said one source;

transmitting said text data from said one source to said source database for storage;

assigning said text data from said one source to a unique video program channel;

reading said text data from said one source from said source database and formatting associated display commands and said text data stored in said source database into transactions having a predetermined number of bytes;

inserting each transaction into a predetermined interval of the unique video program channel to which the text data in that transaction is assigned;

at a customer's text data receiver, extracting said transactions from their unique video program channel;

processing said transactions at said customer's text data receiver to extract said text data and said associated display commands; and presenting a screen of said text data in said transactions processed in said processing step to said customer's television display in accordance with said associated display commands in said transactions.

19. A method as in claim 18, wherein said one source of text data authorized in said authorizing step for access to said source database provides electronic program guide (EPG) data representing the video programs available for display on said customer's television display.

20. A method as in claim 18, wherein said transmitting step includes the step of transmitting said text data to said source database via a communications link comprising at least one of a satellite link and a modem link to said source database.

21. A method as in claim 20, wherein said transmitting step includes the steps of receiving said text data at an interface device of said source database which comprises common input ports for each of said sources of text data and routing the received text data to said source database.

22. A method as in claim 21, wherein said transmitting step includes the further step of sending a command response message to said one source upon receipt of a command from said one source including said text data.

23. A method as in claim 18, comprising the further step of compressing said text data prior to storage in said source database.

24. A method as in claim 20, comprising the further steps of sorting received EPG data by video program channel and time of day.

25. A method as in claim 18, wherein said assigning step includes the steps of assigning said source database to said one source of text data, routing text data from said one source to said source database, and updating access authorization to said source database for said one source of text data.

26. A method as in claim 18, wherein said reading and formatting step comprises the steps of forming said transactions as display commands for a predetermined number of characters of said text data and of instructing said customer's text data receiver regarding where and how to display said text data in said transactions on said customer's television display.

27. A method as in claim 26, wherein said predetermined interval is a vertical blanking interval of the unique video program channel to which that text data is assigned and said inserting step includes the step of inserting said transactions into said vertical blanking interval of said unique video program channel.

28. A method as in claim 27, wherein said inserting step includes the further steps of storing a number of transactions for creating a screen of text data on said customer's television display and of inserting said transactions into said vertical blanking interval of said unique video program channel to which the source which produced the text data in said number of transactions is assigned.

29. A method as in claim 19, comprising the further step of storing EPG data in an EPG memory of said customer's text data receiver representing the video programs available for display on said customer's television display over a predetermined interval of time.

30. A method as in claim 29, comprising the further step of storing a video display template in a template memory of said customer's text data receiver for insertion of said EPG data for display, said template representing a time grid for each authorized video programming channel in said EPG data which may be received by said customer's television display.

31. A method as in claim 30, comprising the further step of scrolling through said EPG data stored in said EPG memory of said customer's text data receiver.

32. A method as in claim 18, comprising the further step of storing at least a page of text data in a text memory of said customer's text data receiver for presentation to said customer's television display.

33. A method as in claim 18, wherein said presenting step includes the steps of tuning said customer's text data receiver to a frequency of a video program channel containing in its vertical blanking interval the text data for a text channel designated by the customer and presenting said text data to said customer's television display when said customer selects said designated text channel.

34. A method as in claim 18, comprising the further step of delaying a predetermined amount of time after a page of text data has been presented to said customer's television display before presenting a next page of text data to said customer's television display.

35. A data controller for controlling the presentation of text data received from a text service provider to a customer's television display associated with said data controller, wherein said text data is received from said text service provider as transactions which have been inserted into a vertical blanking interval of a video program channel to which the text data in said transactions has been assigned, each transaction comprising text data and associated display commands for controlling presentation of text data in said transaction to said customer's television display, said data controller comprising:

a tuner for tuning said customer's television display to said video program channel; and a processor which extracts said transactions from said vertical blanking interval of said video program channel and maps the text data received in said transactions to a text channel of the customer's television display for presentation of a screen of said text data on said text channel in accordance with the display commands received in said transactions.

36. A data controller as in claim 35, further comprising an EPG memory for storing EPG data representing the video programs available for display on said customer's television display over a predetermined interval of time.

37. A data controller as in claim 36, further comprising a template memory for storing a video display template into which said EPG data is inserted for display on said customer's television display, said video display template representing a time grid for each authorized video programming channel in said EPG data which may be received by said customer's television display.

38. A data controller as in claim 36, wherein said processor selectively accesses said EPG data in said EPG memory so as to allow said customer to scan through said EPG data.

39. A data controller as in claim 35, further comprising a text memory for storing at least a page of text data for presentation to said customer's television display.

40. A data controller as in claim 39, wherein said processor selectively accesses text data in said text memory so as to allow said customer to scroll through said text data.

41. A data controller as in claim 35, wherein said processor comprises a bit map for correlating said text channel on the customer's television display to a frequency which must be tuned by said tuner to get the text data for the text channel from a vertical blanking interval of the video program channel containing the text data for the text channel.

* * * * *